US010229269B1

(12) United States Patent
Patton et al.

(10) Patent No.: US 10,229,269 B1
(45) Date of Patent: Mar. 12, 2019

(54) DETECTING RANSOMWARE BASED ON FILE COMPARISONS (71) Applicant: Malwarebytes Inc., Santa Clara, CA (US)

(72) Inventors: Mark William Patton, San Jose, CA (US); Zohiartze Herce San Martín, Algorta (ES); Jorge Alejandro Duran Royo, Santurce (ES); Sherab Giovannini, Portugalete (ES)

(73) Assignee: Malwarebytes Inc., Santa Clara, CA (US)

( * ) Notice: Subject to any disclaimer, the term of this patent is extended or adjusted under 35 U.S.C. 154(b) by 0 days.

(21) Appl. No.: 15/895,673

(22) Filed: Feb. 13, 2018

(51) Int. Cl.
G06F 21/56 (2013.01)
G06F 21/55 (2013.01)
G06F 21/60 (2013.01)

(52) U.S. Cl.
CPC .......... *G06F 21/566* (2013.01); *G06F 21/554* (2013.01); *G06F 21/565* (2013.01); *G06F 21/602* (2013.01); *G06F 2221/034* (2013.01)

(58) Field of Classification Search
CPC .................................................... G06F 21/566
See application file for complete search history.

(56) References Cited

U.S. PATENT DOCUMENTS

| 9,852,289 | B1* | 12/2017 | Mann | G06F 21/554 |
|---|---|---|---|---|
| 2018/0018458 | A1* | 1/2018 | Schmugar | G06F 21/566 |
| 2018/0048657 | A1* | 2/2018 | Hittel | H04L 63/145 |
| 2018/0048658 | A1* | 2/2018 | Hittel | H04L 63/145 |
| 2018/0075234 | A1* | 3/2018 | Boutnaru | G06F 21/554 |
| 2018/0075239 | A1* | 3/2018 | Boutnaru | G06F 21/566 |
| 2018/0107824 | A1* | 4/2018 | Gibbons, Jr. | G06F 21/565 |

* cited by examiner

Primary Examiner — Simon P Kanaan
(74) Attorney, Agent, or Firm — Fenwick & West LLP (57) ABSTRACT An anti-malware application detects and remediates ransomware. The anti-malware application monitors processes executing on a computing device and detects that a process is opening a file for editing. A portion of the original file is saved prior to being edited by the process. Once the edited file is saved, the anti-malware application compares a portion of the edited file to the portion of the original file to determine if the edited file is encrypted. The anti-malware application may determine the process is associated with ransomware based on whether the edited file is encrypted.

20 Claims, 4 Drawing Sheets

DETECTING RANSOMWARE BASED ON FILE COMPARISONS

FIELD OF ART

The present disclosure generally relates to malware detection and more specifically to detecting ransomware using encryption detection.

BACKGROUND

Ransomware is malware that encrypts or locks computer files, and then demands payment of a "ransom" to decrypt or unlock them. There is no guarantee that paying the ransom will regain access and victims of ransomware can be subject to multiple attacks if they are not protected. Ransomware is traditionally very difficult to detect, stop, and remediate.

One conventional way to detect ransomware is to determine whether a process is encrypting files. However, modern forms of ransomware may encrypt files in ways that make it more difficult to detect encryption using traditional methods.

SUMMARY

A method detects and remediates malware. A process executing on a computing device is monitored. A processor detects an opening of an original file by the process for editing. Responsive to detecting the opening of the original file for editing, a portion of the original file is saved prior to the original file being edited by the process. The processor determines whether the edited file is encrypted based on a comparison of a portion of the edited file to the portion of the original file prior to being edited. The processor may determine whether the process corresponds to ransomware based on detecting that the edited file is encrypted. Responsive to determining the process corresponds to ransomware, the processor remediates the ransomware.

In one embodiment, responsive to determining the edited file is encrypted, a new indicator may be stored to a log in a storage device. The log also stores a plurality of past indicators for respective previously detected behaviors of the process. The new indicator and the plurality of past indicators are each associated with respective scores. A running score for the process is generated by combining the respective scores of the plurality of past indicators and the new indicator associated with the process in the log. The processor may determine whether the process corresponds to ransomware based on whether the running score exceeds a predefined threshold score.

In another embodiment, a non-transitory computer-readable storage medium stores instructions that when executed by a processor causes the processor to execute the above-described method.

In yet another embodiment, a computer system includes a processor and a non-transitory computer-readable storage medium that stores instructions for executing the above-described method.

BRIEF DESCRIPTION OF THE DRAWINGS

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

DETAILED DESCRIPTION

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

An anti-malware application stops ransomware attacks and eliminates the ransomware file causing the attack. The anti-malware application detects ransomware by monitoring processes for behavior indicative of ransomware, including encrypting user files. In order to detect advanced forms of ransomware that encrypt files with low levels of randomness, the anti-malware application may apply an improved method for detecting encryption in which a file that is edited by a process is compared to the original file before modification. By comparing the changes between the edited file and the original file, the anti-malware application can detect whether the edited file is encrypted with high accuracy, even when ransomware applies an advanced encryption technique that results in low levels of randomness.

Figure 1:
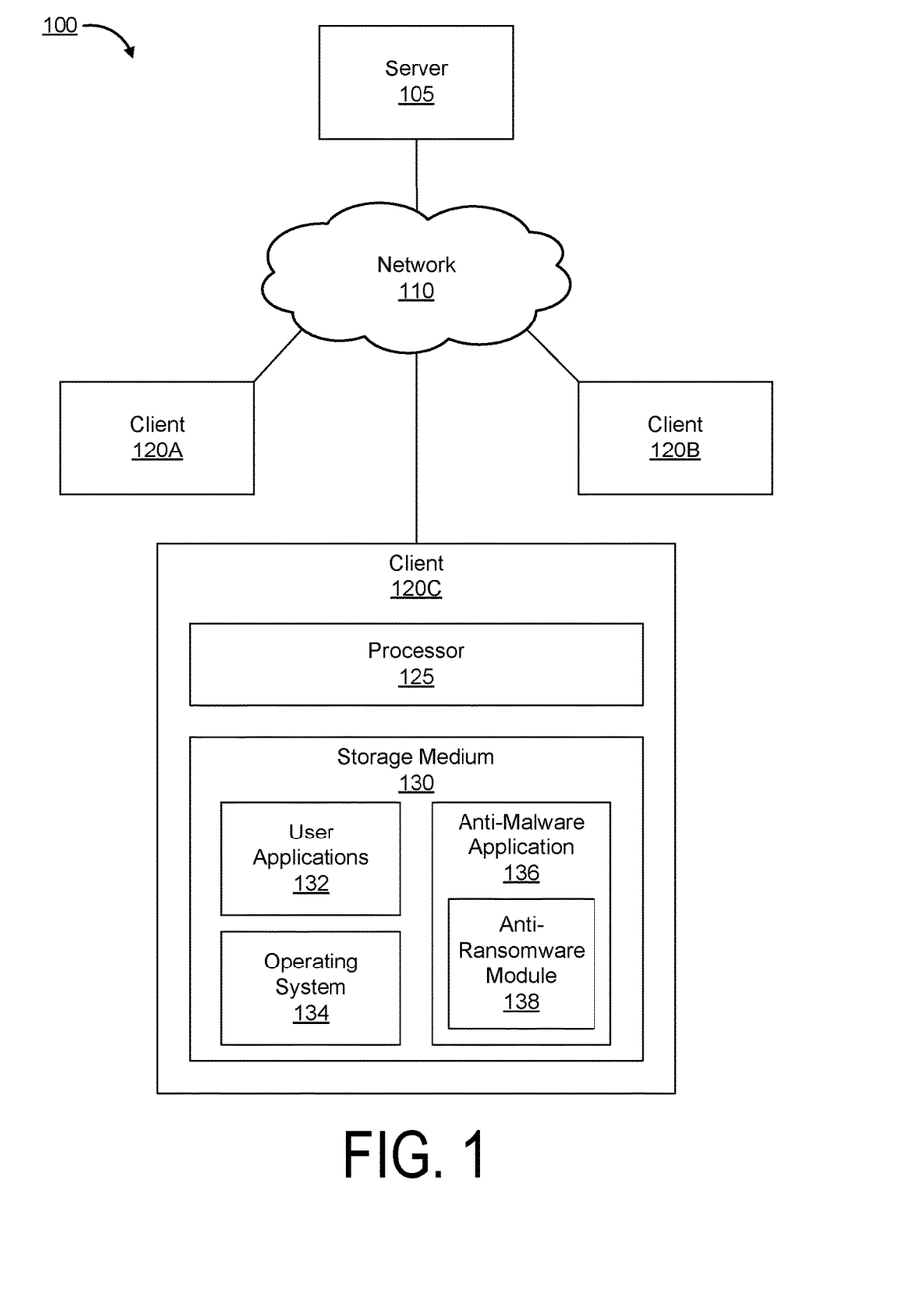
FIG. 1 is a system diagram illustrating an example embodiment of an environment in which an anti-malware application executes.

FIG. 1 is a high-level block diagram illustrating a system environment 100 for an anti-malware application. The system environment 100 comprises a server 105, a network 110, and various clients 120A, 120B, 120C (collectively referenced herein as clients 120). For simplicity and clarity, only one server 105 and a limited number of clients 120 are shown; however, other embodiments may include different numbers of servers 105 and clients 120. Furthermore, the system environment 100 may include different or additional entities.

The server 105 is a computer system configured to store, receive, and transmit data to client devices 120 via the network 110. The server 105 may include a singular computing system, such as a single computer, or a network of computing systems, such as a data center or a distributed computing system. In an embodiment, the server 105 is a content or data server providing information to a client 120. For example, the server 105 may be a website server that provides web content for viewing on clients 120. Furthermore, the server 105 may be a file server that provides files that can be downloaded by the clients 120. The server 105 may receive requests for data from clients 120 and respond by transmitting the requested data to the clients 120. The server 105 is a potential source of malware that may infiltrate one or more clients 120. For example, as a user browses websites or downloads network files, malware embedded in the website or files may become installed on a client 120, often without the user's knowledge.

The network 110 represents the communication pathways between the server 105 and clients 120. In one embodiment, the network 110 is the Internet. The network 110 can also utilize dedicated or private communications links that are not necessarily part of the Internet. In one embodiment, the network 110 uses standard communications technologies and/or protocols. Thus, the network 110 can include links using technologies such as Ethernet, Wi-Fi (802.11), integrated services digital network (ISDN), digital subscriber line (DSL), asynchronous transfer mode (ATM), etc. Similarly, the networking protocols used on the network 110 can include multiprotocol label switching (MPLS), the transmission control protocol/Internet protocol (TCP/IP), the hypertext transport protocol (HTTP), the simple mail transfer protocol (SMTP), the file transfer protocol (FTP), etc. In one embodiment, at least some of the links use mobile networking technologies, including general packet radio service (GPRS), enhanced data GSM environment (EDGE), long term evolution (LTE), code division multiple access 2000 (CDMA2000), and/or wide-band CDMA (WCDMA). The data exchanged over the network 110 can be represented using technologies and/or formats including the hypertext markup language (HTML), the extensible markup language (XML), the wireless access protocol (WAP), the short message service (SMS) etc. In addition, all or some of the links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

Each client 120 comprises one or more computing devices capable of processing data as well as transmitting and receiving data via a network 110. For example, a client device 120 may be a desktop computer, a laptop computer, a smart phone, a tablet computing device, an Internet of Things (IoT) device, or any other device having computing and data communication capabilities. Each client 120 includes a processor 125 for manipulating and processing data, and a storage medium 130 for storing data and program instructions associated with various applications. The storage medium 130 may include both volatile memory (e.g., random access memory) and non-volatile storage memory such as hard disks, flash memory, flash drives, external memory storage devices, USB drives, discs and the like. In addition to storing program instructions, the storage medium 130 stores various data associated with operation of the operating system 134, the anti-malware application 136, and other applications 132.

In one embodiment, the storage medium 130 comprises a non-transitory computer-readable storage medium. Various executable programs (e.g., the operating system 134, anti-malware application 136, and user applications 132) are each embodied as computer-executable instructions stored to the non-transitory computer-readable storage medium. The instructions, when executed by the processor 125, cause the client 120 to perform the functions attributed to the programs described herein.

The operating system 134 is a specialized program that manages computer hardware resources of the client 120 and provides common services to the user applications 132. For example, a computer's operating system 134 may manage the processor 125, storage medium 130, or other components not illustrated such as, for example, a graphics adapter, an audio adapter, network connections, disc drives, and USB slots. A cell phone's operating system 134 may manage the processor 125, storage medium 130, display screen, key pad, dialer, wireless network connections and the like. Because many programs and executing processes compete for the limited resources provided by the processor 125, the operating system 134 may manage the processor bandwidth and timing to each requesting process. Examples of operating systems 134 include WINDOWS, MAC OS, IOS, LINUX, UBUNTU, UNIX, and ANDROID.

The user applications 132 may include applications for performing a particular set of functions, tasks, or activities for the benefit of the user. Examples of user applications 132 may include a word processor, a spreadsheet application, and a web browser. In some cases, a user application 132 can be a source of malware that is unknowingly hidden in the user application 132. The malware may infect the client 120 when the user application 132 is installed.

An anti-malware application 136 detects and remediates malware, which may include ransomware as well as other types of malware. The anti-malware application 136 may prevent new malware from being installed on a client 120 or remove or disable existing malware that is already present on the client 120. The anti-malware application 136 may furthermore access a central server via the network 110 in order to download new malware definition files that specify characteristics or behaviors of known malware that the anti-malware application 136 seeks to detect. The anti-malware application includes an anti-ransomware module 138 that is specifically configured to detect and remediate ransomware. The anti-ransomware module 138 detects ransomware, in part, by identifying if a process encrypts files. The anti-ransomware module 138 is described in further detail below.

Figure 2:
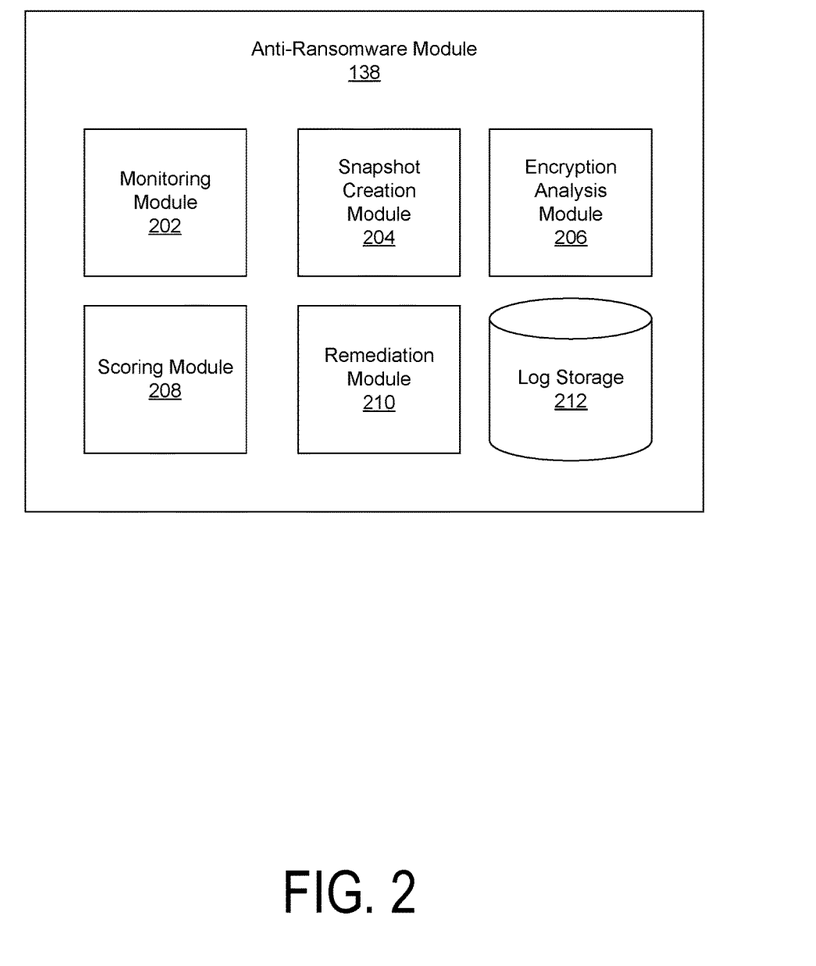
FIG. 2 is a block diagram illustrating an example embodiment of an anti-ransomware module of the anti-malware application.

FIG. 2 illustrates an example embodiment of an anti-ransomware module 138. The anti-ransomware module includes a monitoring module 202, a snapshot creation module 204, an encryption analysis module 206, a scoring module 208, a remediation module 210, and a log storage 212. Alternative embodiments may include different or additional modules or omit one or more of the illustrated modules.

The monitoring module 202 monitors executing processes and stores metadata associated with each executing process to the log storage 212. A process is an instance of a computer program or component thereof (e.g., a user application 132 or operating system 134) that is being executed. The monitoring module 202 identifies when a monitored process opens a file for editing. For example, the monitoring module 202 may detect certain application programming interface (API) calls from a process that are associated with opening and modifying the file. The monitoring module 202 also identifies when the process saves and closes the file (e.g., by detecting certain API call from the process that are associated with saving and closing the file). The monitoring module 202 may furthermore monitor and log other behaviors of processes that may be indicative of ransomware such as deleting files, injecting code from one process into another process, modifying or creating cryptographic keys in registry locations, accessing restricted locations of the operating system 134, and deleting a system recovery file.

In one embodiment, the monitoring module 202 identifies safe processes that meet certain predefined criteria. The criteria may include: (1) the process is a system protected file, (2) the process is a file that is signed with a trusted certificate, (3) the process is on a whitelist of known processes that are not ransomware or processes that are goodware, or a predefined combination thereof. The monitoring module 202 may also determine if the age of the process meets a predefined threshold age as a factor in identifying that the process is safe. Ransomware tends to execute soon after being installed, so a more recent process is more likely to be ransomware than a process that is not as recent. The monitoring module 202 may also identify that a process is safe if the process does not exhibit suspicious behavior which is characteristic of ransomware. For example, ransomware enumerates files or folders to look for user files to encrypt. The criteria may include that the process does not enumerate files and folders. If the monitoring module 202 identifies the executing process is a safe process, the monitoring module 202 ceases to monitor the process. Unless the monitoring module 202 identifies the process as a safe process, the monitoring module 202 further monitors the process for opening one or more files for editing. The monitoring module 202 may send a notification to the snapshot creation module 204 indicating that a file has been opened for editing. The monitoring module 202 further monitors the process for closing the previously opened file. The monitoring module 202 may determine if the closed file has been modified before sending a notification to the encryption analysis module 206 that an edited file has been closed to enable the encryption analysis module 206 to detect whether the edited file was encrypted by the process.

In one embodiment, the monitoring module 202 also identifies other behaviors indicative of ransomware and stores an indicator (e.g. from a predefined list of indicators each corresponding to a respective behavior) to the log storage 212 that uniquely identifies the detected behavior together with a timestamp indicating the time of detection. The behavior may be one of those previously mentioned such as deleting files, injecting code from one process into another process, modifying or creating cryptographic keys in registry locations, accessing restricted locations of the operating system 134, and deleting a system recovery file. In an embodiment, the monitoring module 202 may store a new indicator associated with the age of the process.

The snapshot creation module 204 saves a snapshot comprising at least a portion of an original file prior to the file being edited by a process. The snapshot creation module 204 may receive a notification from the monitoring module 202 indicating that a file has been opened for editing by a process that has not been deemed safe by the monitoring module 202. Responsive to receiving the notification that the file has been opened for editing, the snapshot creation module 204 saves the snapshot of the original file prior to the file being edited to log storage 212. The snapshot of the original file may comprise the entire file or a portion of the file (e.g., the initial 8 kilobytes of the file).

The encryption analysis module 206 determines if an edited file has been encrypted. The encryption analysis module 206 may receive a notification from the monitoring module 202 upon the monitoring module detecting that the edited file has been closed by the process that was not deemed safe by the monitoring module 202. The encryption analysis module 206 reads the snapshot of the original file from log storage 212 and reads a corresponding portion of the edited file (e.g., the entire edited file or the predefined number of initial kilobytes of the file). The encryption analysis module 206 compares the snapshot of the original file to a corresponding portion of the edited file and determines if the edited file has been encrypted based on the comparison. If the encryption analysis module 206 determines that the file is encrypted, the encryption analysis module 206 may store an indicator associated with the process to the log storage 212 indicating the encryption detection together with a timestamp indicating the time of detection. Additional details regarding the encryption analysis module 206 is further described with reference to FIG. 4.

The scoring module 210 generates a score associated with a monitored process to determine if the process is ransomware. In some embodiments, the scoring module 210 determines the process is ransomware based at least in part on detecting that the process performs encryption of a file. For example, the scoring module 210 may determine that the process is ransomware if the process encrypts at least a predefined number of files over a certain period of time. The scoring module 210 may calculate a score based on the number of times the process has encrypted files in a certain period of time based on the indicators stored to the log storage 212. The scoring module 210 may determine the process is ransomware if the calculated score is greater than a threshold score. In alternative embodiments, the scoring module 210 may determine the process is ransomware based on the process encrypting a file only once.

In other embodiments, the scoring module 210 detects ransomware based on detecting encryption of files in combination with other factors. For example, the scoring module 210 may generate a score for the process based on both the age of the process and the number of files encrypted by the process within a limited time window as determined by the indicators stored to the log storage 212. In other embodiments, the scoring module 210 generates a score for the process based on combined scores of indicators associated with a process in log storage 212 that may relate to detecting that the process encrypts a file or to other behaviors indicative of ransomware. Each of the indicators for different types of behaviors may have a score and a timestamp indicating the time of detection of the behavior. For each executing process, the scoring module 208 generates a respective running score based on the combined scores of active indicators (e.g., within a predefined time period) associated with that process in the log storage 212.

The scoring module 208 may trigger a ransomware detection when the combined score exceeds a predefined threshold. The scores associated with each indicator, the detection threshold, and the time period until an indicator expires may each be tailored to enable reliable and quick detection of ransomware with a low rate of false positives. For example, the scoring system may be applied to a test client 120 with known instances of ransomware executing, and an optimization algorithm may be used to optimize the scores for each indicator, the detection threshold, and the expiration time period to achieve desired tradeoff between performance parameters (e.g., speed of detection, false positive rate, false negative rate, etc.). This optimization may be performed periodically by an administrator as new ransomware becomes known. New definition files specifying the indicator list, scoring system, or other parameters may then be periodically provided to the clients 120.

The scoring module 208 may also determine if the process is not ransomware. For example, a process may be monitored for a predefined number of files accessed by the process to identify whether the process encrypts one or more the predefined number of files. Each time the encryption analysis module 206 determines that a process accesses a file but does not encrypt the file, an indicator may be stored to log storage 212 associated with the process that identifies the behavior of accessing the file without encrypting the file together with a timestamp indicating the detection. The scoring module 210 may calculate an unencrypted file detection score based on the number of times the process has accessed but not encrypted a file in a certain period of time. The scoring module 210 may determine the process is not ransomware if the calculated unencrypted file detection score is greater than an unencrypted file detection threshold score. In some embodiments, if the process was not previously whitelisted because they did not meet criteria to be defined as safe processes, the process may be added to the whitelist used by the monitoring module 202 to deem processes as safe responsive to determining the process is not ransomware.

The remediation module 210 operates to remediate the ransomware when a detection is triggered. Remediation may include terminating the process and quarantining the source file. Quarantining the file isolates the source so that it is no longer capable of affecting operation of the client 120. Quarantining may include deleting the source file or moving it to a special area of memory. Remediation may also include removing the process from the whitelist responsive to determining that the process is on a whitelist.

Figure 3:
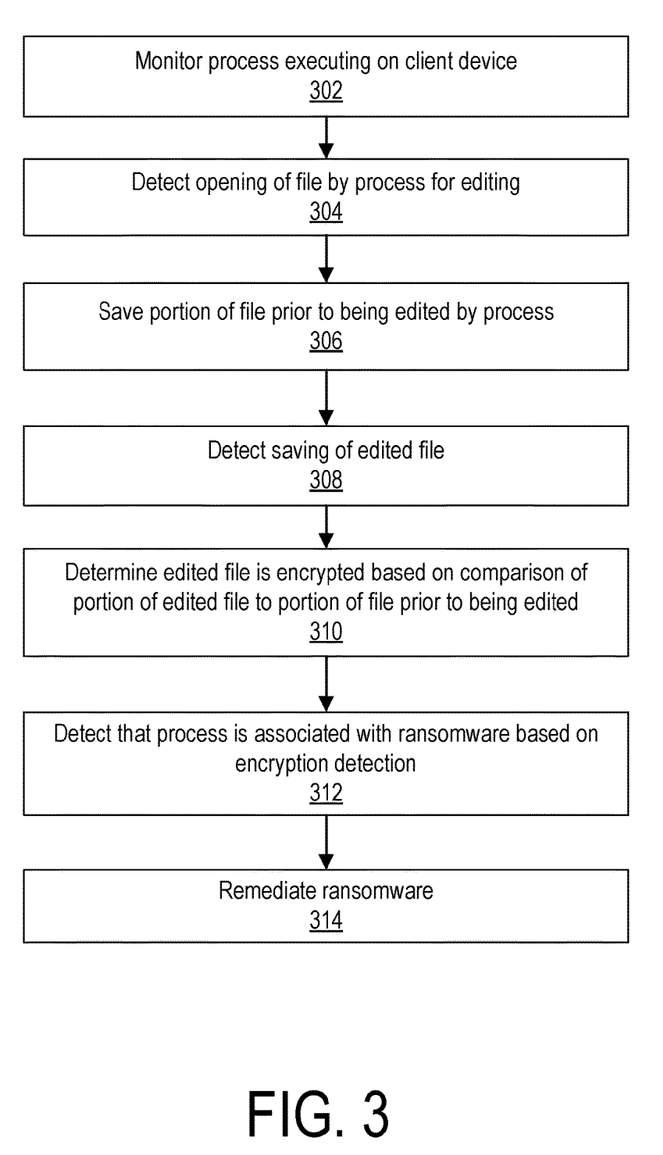
FIG. 3 is a flowchart illustrating an embodiment of a process for detecting a ransomware attack using encryption detection.

FIG. 3 is a flowchart illustrating an embodiment of a process for detecting and remediating ransomware on a client device 120. The monitoring module 202 monitors 302 a process executing on the client device 120. The monitoring module 202 may identify safe processes and may monitor when a process that is not deemed safe opens a file for editing. A safe process may be a process that is a system protected file, on a whitelist, or digitally signed by a trusted source, or a process that is not exhibiting any unusual behavior such as enumerating files or folders. The monitoring module 202 detects 304 the opening of a file by the process for editing. For example, the monitoring module 202 intercepts API calls from the process that will open a file. Prior to the API call executing, the snapshot creation module 204 saves 306 at least a portion of the original file as a snapshot prior to the file being edited by the process. After letting the process edit the file, the monitoring module 202 detects 308 saving of the edited file. Once the edited file is saved, the encryption analysis module 206 determines 310 if the edited file is encrypted based on a comparison of at least a portion of the edited file to the snapshot of the original file captured prior to the file being edited. Details regarding the encryption detection will be discussed in relation to FIG. 4. The scoring module 208 detects 312 if the process is associated with ransomware based on the encryption detection. For example, the scoring module 208 may detect ransomware based on a single encryption detection, multiple encryption detections over a certain time period, or based on one or more encryption detections in combination with the presence or absence of factors indicative of ransomware. Upon detecting ransomware, the remediation module 210 remediates 314 the ransomware. During remediation, the process may be terminated or the source file may be quarantined. If the process is on a whitelist of known safe processes that are not ransomware, the process may be removed from the whitelist. Thus, the monitoring module 202 would not identify the process as safe if the same process is encountered in the future.

Figure 4:
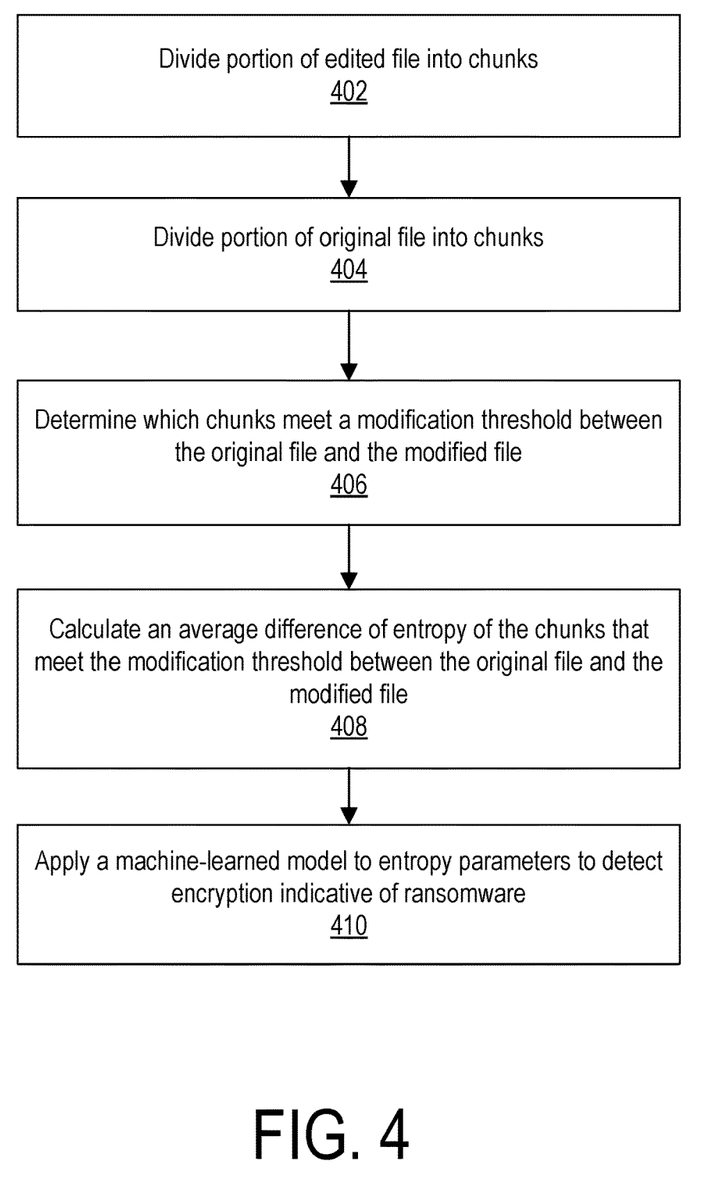
FIG. 4 is a flowchart illustrating an example embodiment of a process for determining if an edited file is encrypted.

FIG. 4 is a flowchart illustrating an example embodiment of a process for determining if an edited file is encrypted. The encryption analysis module 206 divides 402 at least a portion of the edited file into chunks of predefined size (e.g., 512 bytes). The encryption analysis module 206 similarly divides 404 at least a portion of the original file into chunks. Each chunk of the edited file corresponds to a chunk in the original file (e.g., first 512 bytes of the edited file corresponds to the first 512 bytes of the original file). The encryption analysis module 206 determines 406 which corresponding chunk pairs meet a modification threshold between the original file and the edited file. For example, the encryption analysis module 206 may do a byte-wise comparison between the bytes in each chunk pair, counting the number of differences in bytes between the chunk of the original file and the corresponding chunk of the edited file in the chunk pair. The encryption analysis module 206 then determines whether the number of differences exceeds the modification threshold (e.g., greater than 25% of the bytes are changed). The encryption analysis module 206 calculates 408 one or more entropy parameters representing an entropy measure associated with the file. Here, the encryption analysis module 206 may calculate one or more entropy values for each chunk of a chunk pair meeting the modification threshold. The one or more entropy values may be calculated according to one or more different types of entropy measures such as a Chi-Square entropy, Monte Carlo Pi entropy, and/or Shannon entropy. For each pair of entropy values, an entropy difference is then determined based on a difference between the respective entropies values of each type of each chunk in the chunk pair. For example, a difference of Chi-Square entropy values, a difference of Monte Carlo Pi entropy values, and a difference of Shannon entropy values may be calculated for each chunk pair. The differences may then be averaged across all chunk pairs in a file for each type of entropy measure to generate the entropy parameters. Thus, for a given file, the process may generate, for example, a Chi-Square entropy parameter, a Monte Carlo Pi entropy parameter, and a Shannon entropy parameter. The encryption analysis module 206 applies 410 a machine-learned model to the entropy parameters to detect encryption indicative of ransomware. In one embodiment, the encryption analysis module 206 generates additional parameters that are used together with the entropy parameters as inputs to the machine-learned model for detecting ransomware. Here, the encryption analysis module 206 applies a decision tree representing the machine-learned model to determine if the file has been encrypted. Inputs to the decision tree may include the entropy parameters, a compression percentage, a value indicating whether the new file size is a multiple of a predefined size, and whether the new file has a ransomware file header on a blacklist of known ransomware file headers. Here, the compression percentage represents a ratio size of the edited file to the size of the original file. Furthermore, detecting whether the file size of the new file is a multiple of a predefined size is useful to detect certain custom encryption techniques that are known to generate encrypted data of a particular size.

The model may be trained, for example, by similarly generating entropy parameters associated with files that have been modified by known ransomware and files that have been modified by known safe processes. A classifier is then learned that can classify an input sequence of entropy parameters as either resulting from a safe process or ransomware based on relative similarities between the input entropy parameters and reference parameters for the safe processes and the ransomware processes. The training data for the decision tree may include a collection of original files with common file extensions and file formats attacked by ransomware, multiple collections of encrypted files (a collection for each ransomware sample used in the training), and a mapping between the original file name and the encrypted file name for each collection of encrypted file in case the ransomware uses random names for encrypted files. From the collections, different datasets are created. For unencrypted files, datasets may include pairs of files with the same extension and comparable size to simulate editing a file with the same file format, or pairs of files before and after being compressed to simulate normal file compression. For encrypted files, each ransomware sample includes mappings between original files and encrypted files to create unique datasets. The training for the decision tree may include several passes. For certain ransomware samples, reinforcement techniques may be used to improve detection rate. The training for the decision tree is iterative until the decision has low error rates (e.g., less than 10%) for false positives (unencrypted edited files incorrectly classified as encrypted) and low error rates (e.g., less than 10%) for false negatives (encrypted edited files incorrectly classified as not encrypted).

The above-described system and processes beneficially enables reliable detection and remediation of ransomware. By comparing portion of the original file to the edited file, the anti-malware application 136 can detect many different instances of ransomware based on detecting when an edited file is encrypted by a suspicious process. By comparing portions of an edited file to portions of the original file, it is possible to detect encryption of edited file even when ransomware tries to escape detection of an encrypted edited file by using methods to encrypt the file to have less entropy than conventional methods of encryption.

ADDITIONAL CONSIDERATIONS

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A method for detecting ransomware comprising:
   monitoring a process executing on a computing device;
   detecting, by a processor, an opening of an original file by the process for editing;
   responsive to detecting the opening of the original file by the process for editing, saving a portion of the original file prior to the original file being edited by the process;
   detecting, by the processor, saving of an edited file, corresponding to the original file edited by the process;
   responsive to detecting the saving of the edited file, dividing the portion of the edited file into chunks;
   dividing the portion of the original file into chunks corresponding to the chunks of the edited file;
   performing comparisons between chunk pairs, each comprising a chunk of the original file and a corresponding chunk of the edited file;
   determining respective difference measures for each of the chunk pairs based on the comparisons;
   determining chunk pairs that have difference measures meeting a modification threshold;
   calculating one or more entropy parameters representing an average of entropy differences between respective chunks in each of the chunk pairs that have the difference measures meeting the modification threshold;
   determining, by the processor, whether the edited file is encrypted based on the one or more entropy parameters;
   determining if the process corresponds to the ransomware based on detecting that the edited file is encrypted; and
   responsive to determining that the process corresponds to the ransomware, remediating the process.

2. The method of claim 1, further comprising
   applying a machine-learned model to the one or more entropy parameters to detect encryption indicative of ransomware.

3. The method of claim 1, wherein determining the chunk pairs that meet the modification threshold comprises:
   performing a byte-wise comparison between respective bytes of chunks in each of the chunk pairs to determine a count of differences; and
   responsive to determining that the count of differences for a given chunk pair exceeds a threshold count, determining that the given chunk pair meets the modification threshold.

4. The method of claim 1, wherein calculating the one or more entropy parameters comprises:

calculating one or more pairs of entropy values for respective chunks in each of the chunk pairs;

calculating entropy differences between each of the one or more pairs of entropy values in each of the chunk pairs; and averaging the entropy differences for each of the one or more types of entropy measures to generate the one or more entropy parameters.

5. The method of claim 4, wherein calculating the one or more pairs of entropy values comprises:

calculating a plurality of different pairs of entropy values using different entropy calculation algorithms.

6. The method of claim 1, wherein determining, by the processor, whether the edited file is encrypted is further based on at least one of:

a compression percentage of the edited file to the original file, a value indicating whether a size of the edited file is a multiple of a predefined size, and whether the edited file includes a ransomware file header included in a blacklist.

7. The method of claim 1, further comprising:

responsive to determining that the process is on a whitelist of known processes that are not ransomware, removing the process from the whitelist, wherein monitoring the process executing on a computing device comprises monitoring processes that are not on the whitelist.

8. The method of claim 1, further comprising:

determining if the process does not correspond to ransomware based on detecting that the edited file is unencrypted; and responsive to determining that the process does not correspond to ransomware, placing the process on a whitelist of known processes that are not ransomware, wherein monitoring the process executing on a computing device comprises monitoring processes that are not on the whitelist.

9. The method of claim 8, wherein determining that the process does not correspond to ransomware comprises determining that the process does not encrypt greater than a threshold number of files that the process has opened for editing.

10. The method of claim 1, wherein monitoring the process executing on a computing device comprises:

determining if the process is safe based on at least one of:
(a) determining if the process is a system protected file,
(b) determining if the process is on a whitelist of known processes that are not ransomware,
(c) determining if the process is digitally signed by a trusted source, and
(d) determining if an age of the process exceeds a threshold age;
and wherein detecting the opening of the original file is performed responsive to failing to determine that the process is safe.

11. The method of claim 1, wherein determining if the process corresponds to the ransomware based on detecting that the edited file is encrypted comprises:

responsive to determining that the edited file is encrypted by the process, storing a new indicator associated with the detecting that the edited file is encrypted to a log in a storage device, the log storing a plurality of past indicators for respectively detected behaviors of the process, and the log storing respective scores for the new indicator and the plurality of past indicators;

generating a running score for the process by combining the respective scores of the plurality of past indicators and the new indicator associated with the process in the log;

determining that the running score for the process exceeds a predefined threshold score; and responsive to determining that the running score exceeds the predefined threshold score, determining that the process corresponds to the ransomware.

12. A non-transitory computer-readable storage medium storing instructions for detecting ransomware, the instructions when executed by a processor cause the processor to perform steps including:

monitoring a process executing on a computing device;

detecting, by a processor, an opening of an original file by the process for editing;

responsive to detecting the opening of the original file by the process for editing, saving a portion of the original file prior to the original file being edited by the process;

detecting, by the processor, saving of an edited file, corresponding to the original file edited by the process;

responsive to detecting the saving of the edited file, dividing the portion of the edited file into chunks;

dividing the portion of the original file into chunks corresponding to the chunks of the edited file;

performing comparisons between chunk pairs, each comprising a chunk of the original file and a corresponding chunk of the edited file;

determining respective difference measures for each of the chunk pairs based on the comparisons;

determining chunk pairs that have difference measures meeting a modification threshold;

calculating one or more entropy parameters representing an average of entropy differences between respective chunks in each of the chunk pairs that have the difference measures meeting the modification threshold;

determining, by the processor, whether the edited file is encrypted based on the one or more entropy parameters;

determining if the process corresponds to the ransomware based on detecting that the edited file is encrypted; and responsive to determining that the process corresponds to the ransomware, remediating the process.

13. The non-transitory computer-readable storage medium of claim 12, the instructions further including applying a machine-learned model to the one or more entropy parameters to detect encryption indicative of ransomware.

14. The non-transitory computer-readable storage medium of claim 12, wherein determining the chunk pairs that meet the modification threshold comprises:

performing a byte-wise comparison between respective bytes of chunks in each of the chunk pairs to determine a count of differences; and responsive to determining that the count of differences for a given chunk pair exceeds a threshold count, determining that the given chunk pair meets the modification threshold.

15. The non-transitory computer-readable storage medium of claim 12, wherein calculating the one or more entropy parameters comprises:

calculating one or more pairs of entropy values for respective chunks in each of the chunk pairs;

calculating entropy differences between each of the one or more pairs of entropy values in each of the chunk pairs; and averaging the entropy differences for each of the one or more types of entropy measures to generate the one or more entropy parameters.

16. The non-transitory computer-readable storage medium of claim 15, wherein calculating the one or more pairs of entropy values comprises:
calculating a plurality of different entropy values using different entropy calculation algorithms.

17. A computing system comprising:
a processor; and
a non-transitory computer-readable storage medium storing instructions for detecting ransomware, the instructions when executed by the processor cause the processor to perform steps including:
monitoring a process executing on a computing device;
detecting, by a processor, an opening of an original file by the process for editing;
responsive to detecting the opening of the original file by the process for editing, saving a portion of the original file prior to the original file being edited by the process;
detecting, by the processor, saving of an edited file, corresponding to the original file edited by the process;
responsive to detecting the saving of the edited file, dividing the portion of the edited file into chunks;
dividing the portion of the original file into chunks corresponding to the chunks of the edited file;
performing comparisons between chunk pairs, each comprising a chunk of the original file and a corresponding chunk of the edited file;
determining respective difference measures for each of the chunk pairs based on the comparisons;
determining chunk pairs that have difference measures meeting a modification threshold;
calculating one or more entropy parameters representing an average of entropy differences between respective chunks in each of the chunk pairs that have the difference measures meeting the modification threshold;
determining, by the processor, whether the edited file is encrypted based on the one or more entropy parameters;
determining if the process corresponds to the ransomware based on detecting that the edited file is encrypted; and
responsive to determining that the process corresponds to the ransomware, remediating the process.

18. The computing system of claim 17, the instructions further including
applying a machine-learned model to the one or more entropy parameters to detect encryption indicative of ransomware.

19. The computing system of claim 17, wherein determining the chunk pairs that meet the modification threshold comprises:
performing a byte-wise comparison between respective bytes of chunks in each of the chunk pairs to determine a count of differences; and
responsive to determining that the count of differences for a given chunk pair exceeds a threshold count, determining that the given chunk pair meets the modification threshold.

20. The computing system of claim 18, wherein calculating the one or more entropy parameters comprises:
calculating one or more pairs of entropy values for respective chunks in each of the chunk pairs;
calculating entropy differences between each of the one or more pairs of entropy values in each of the chunk pairs; and
averaging the entropy differences for each of the one or more types of entropy measures to generate the one or more entropy parameters.

* * * * *